United States Patent Office 3,377,145
Patented Apr. 9, 1968

3,377,145
ENAMELLED ALUMINUM COMPOSITE BASE
Paul F. Wallace and Charles J. Walton, New Kensington, Pa., assignors to Aluminum Company of America, Pittsburgh, Pa., a corporation of Pennsylvania
No Drawing. Filed Nov. 9, 1964, Ser. No. 409,985
12 Claims. (Cl. 29—195)

The present invention relates to vitreous enamelled products of aluminum base alloy cores clad with another alloy, and more particularly, to providing a clad aluminum base alloy laminate which will form a highly satisfactory host to a vitreous enamel coating.

While the aluminum-magnesium alloy and aluminum-magnesium-silicon alloy offer the advantage of high strength which is especially important in structures that must withstand loads imposed by the structure itself or by the atmosphere, it has been found that vitreous enamels react with their surfaces causing discoloration, and also, in some cases, do not properly adhere.

Among the objects of the invention is the provision of a relatively high strength core of an aluminum base alloy which contains magnesium as a primary alloy addition and a specific cladding for said core, all in a manner to inhibit or, at least, suppress deleterious effects on a subsequently applied coating of vitreous enamel, the said effects being such as discoloration or susceptibility to spalling or both. It is a particular object to provide a clad aluminum base alloy product for the application of a vitreous enamel coating, where the core alloy contains the intermetallic compound, $Mg_2Si$, as the primary strengthening constituent, said clad product exhibiting freedom from discoloration and spalling after the enamel coating has been fired.

It is also a purpose of this invention to provide a strong base for an enamel coated article which can withstand the temperature range of enamel fusion, such as from 900 to 1050° F., which is usually necessarily used in the application of commercially available enamel compositions.

The invention is applicable to clad articles in which the core consists of aluminum base alloys containing magnesium, either as the sole added component or in combination with other elements such as silicon, manganese, chromium and the like where the clad product is subsequently coated with vitreous enamel. Pure aluminum has been used for cladding alloy cores containing magnesium but the cladding can be detrimentally affected by the diffusion of alloying elements from the core in respect to adhesion of the enamel to the cladding. To provide a cladding of sufficient thickness to prevent harmful diffused elements at the enamel metal intrface reduces the over-all strength of the product for the thickness of the strong alloy core must be reduced if unusual cladding thicknesses are specified and the total thickness of the clad product must, usually, not exceed some value specified by considerations of design. Further, a thick cladding adds to the cost and weight of the enamelled product.

The cladding alloy, prior to the enamel coating operation, should be free from elements that cause spalling and reaction with the vitreous enamel resulting in discoloration of the enamel. Moreover, the cladding alloy should be characterized by ready bonding to the core under heat and pressure by conventional procedures, by a capacity to counteract the adverse effect of harmful elements which diffuse into the cladding from the core, and should have such electrochemical relationship to the core that the enamel coating placed on the surface of the cladding is not easily dislodged by selective galvanic corrosion. Nor should unusual surface treatment of core and cladding alloy be required preliminary to the bonding of the two alloys. Preparation of the clad article for reception of the enamel should be effected by a simple degreasing operation, so that expensive deoxidation and alkaline chromate treatments are not required.

We have discovered that the addition of a small amount of copper to aluminum provides a highly desirable alloy for cladding having the characteristics recited above when combined with the aluminum alloy cores hereinafter described. In particular we have found that the presence of 0.2 to 0.75% copper, preferably 0.3 to 0.5%, in aluminum of commercial purity produces a highly satisfactory cladding on such cores where the clad product is to be enamel coated. The impurities which can be tolerated in the cladding are those usually present in commercial aluminum, but the magnesium must be limited to not more than 0.05%.

In accordance with the principle of this invention, the core of the clad product is composed of an aluminum base alloy containing magnesium as the primary added element. The amount of magnesium can vary between 0.3 and 5% depending upon the properties desired and the other alloying elements present. In the aluminum-magnesium type alloys which do not require solution heat treatment, the magnesium content can range between 0.3 and 5.0%. Alloys of this type depend primarily upon the magnesium to provide the desired strength. This property, and others, can be supplemented by the addition of 0.15 to 0.75% copper or by small amounts of at least one of the group of high melting point elements, those elements and their amounts being 0.05 to 1% manganese, 0.05 to 0.35% chromium, and 0.05 to 1.0% Ni. Also, both copper and one or more of the group of high melting point elements, may be used. Aluminum-magnesium alloys, either with or without the foregoing additions, are well known and can be cast and worked by conventional equipment and procedures.

Where a solution heat treatable alloy core is desired, silicon can be added to the aluminum-magnesium alloy base in sufficient amount to provide for the formation of at least 0.5% and up to about 7.9% of the intermetallic compound $Mg_2Si$, the latter value being obtained by combining 5% magnesium with 2.9% of silicon. While alloys which contain such a large quantity of magnesium and silicon can be worked or fabricated, it is preferred to use alloys that contain from 0.5 to 3% of the intermetallic compound because they are more readily worked. It will be appreciated that in commercial practice the precise proportions of magnesium and silicon found in the identified intermetallic compound are seldom achieved and that an excess of either magnesium or silicon is usually present. The excess of either element has no substantial adverse effect upon the mechanical properties of the alloy, but it is, as to this invention, generally desirable that not more than about 0.5% magnesium or more than about 1.5% silicon above the amount occurring in the intermetallic compound be present. In terms of the preferred range for the intermetallic compound this means that the maximum magnesium content should be 2.4% and that of silicon 2.6%. The minimum silicon content needed to form the minimum amount of $Mg_2Si$ is 0.2% while the maximum amount of silicon that should be added is 3%. Commercial alloys containing $Mg_2Si$ within the preferred range usually contain from 0.8 to 1.2% magnesium and 0.4 to 0.8% silicon.

In addition to magnesium and silicon, the alloys may contain from 0.1 to 1.0% copper, or, if desired, at least one element of the group composed of 0.01 to 0.4% chromium, 0.1 to 0.5% manganese, 0.05 to 0.2% titanium and 0.1 to 0.5% nickel or both copper and one or more of the group may be used. Iron may be present, generally as an impurity, up to 0.7% without poor results. A commercially available aluminum base alloy having the nominal composition of 1.0% magnesium, 0.6% silicon, 0.25% copper and 0.25% chromium, balance aluminum and impurities, has been found to be quite suitable for the core. Successful results have also been obtained in cladding a core nominally consisting of aluminum, 0.5% magnesium, 1.5% silicon, 0.3% copper and 0.25% nickel. Enamel coatings applied directly to these core alloys do become discolored.

Using a clad aluminum base alloy core of the kind described above it is possible to use the heating incident to the enamelling operation to dissolve the magnesium and silicon and place them in solid solution particularly if the enamelled product is cooled relatively rapidly from the enamelling temperature. Cooling in air is generally adequate for this purpose. To further improve the strength and hardness of the enamelled product when the core consists of the foregoing aluminum-magnesium-silicon type alloy, the product can be subjected to artificial aging at 275 to 400° F. in accordance with the known principles of thermally treating aluminum base alloys of this type. Such reheating does not induce harmful diffusion of elements into the cladding from the core.

Our invention is illustrated in the following examples that involve tests on both the aluminum-magnesium-silicon and aluminum-magnesium types of core alloys.

Example 1

Two clad products were prepared having as the core an aluminum base alloy nominally composed of aluminum, 0.9% magnesium, 0.6% silicon, 0.25% copper and 0.25% chromium. In one case a sheet of commercially pure aluminum was roll bonded to the core in accordance with commercial practice, and in the other case a sheet of an aluminum-0.3% copper alloy was bonded to the core in the same manner. The clad products were cold rolled to sheet having a thickness of 0.025 inch, the cladding being 0.0025 inch in thickness. Samples were taken from the sheet, degreased and a commercial pigmented enamel slurry applied to the clad surface. The samples were heated in an oven to 1000° F., held at that temperature for ten minutes, withdrawn from the oven and cooled to room temperature in air. To accentuate the effects of diffusing elements into the cladding, the samples were reheated in the same manner and cooled and the cycle repeated a third time. The samples were then subjected to the standard 5% aqueous solution ammonium chloride spalling test, as described in the Porcelain Enamel Institute Bulletin A1–1a of June 1956. This test has been correlated with service experience and is considered to be a reliable guide in judging susceptibility to spalling. The samples having the aluminum cladding spalled whereas those having the aluminum-0.3% copper alloy cladding did not spall thus demonstrating the effectiveness of the alloy cladding under very severe conditions.

In a second test wherein the cladding was only 0.0015 inch in thickness, samples coated with the same enamel were exposed to the ammonium chloride test after but one heating to 1000° F. Here, again, the aluminum clad samples suffered from spalling while those clad with the aluminum-0.3% copper alloy did not spall. It is therefore evident that a very thin alloy cladding was effective in preventing spalling which is highly advantageous where a maximum strength is required in the enamelled product.

Example 2

In this test clad sheet products were made having the same core as base alloy but different cladding. The core in both cases consisted of an alloy having a nominal composition of aluminum, 2.5% magnesium and 0.25 chromium. In one case a sheet of commercially pure aluminum was roll bonded to the alloy core by conventional practices while in the other case a sheet of aluminum-0.25% copper alloy was applied to the core in the same manner. Both rolled products were cold rolled to 0.025 inch thick sheet with the cladding in each case being 0.0025 inch in thickness. Samples of the sheet were degreased and a conventional enamel slurry applied to the clad surface adapted to produce a dark colored enamel. The samples were heated to 1000° F. and cooled to room temperature in ambient air upon removal from the furnace. The enamelled sheet clad with commercially pure aluminum spalled in the standard ammonium chloride spalling test referred to in the preceding sample while the enamelled sheet clad with the aluminum-0.25% copper alloy exhibited no spalling.

Another series of tests were made to reveal the effect of magnesium and other alloying elements upon discoloration of an enamel coating applied to the surface of articles of alloys containing that element. For this test a commercial transparent enamel was applied to the surface of sheet samples of an alloy having a nominal composition of 1.0% magnesium, 0.6% silicon, 0.25% copper, 0.25% chromium and balance aluminum plus impurities. The other sheet samples were those of the clad product described above in the first part of Example 1. The alloy samples were prepared for enamelling by degreasing them and then immersing them in a conventional hot chromic-sulfuric acid solution, thus providing the same surface in both groups of samples for reception of the enamel coating. The enamel slurry was applied to the treated samples after which they were fired by heating in an oven at 1000° F., held at that temperature for ten minutes, withdrawn from the oven and cooled to room temperature in air. The enamel coating on the alloy samples had an opaque gray appearance while the coating on the clad samples was clear and without any discoloration.

Having thus described our invention and certain embodiments thereof,

We claim:

1. An enamelled clad product comprising a core of aluminum base alloy consisting essentially of aluminum and 0.3 to 5.0% magnesium as an essential strength-imparting constituent, a cladding bonded to said core consisting of an alloy composed of aluminum, 0.2 to 0.75% copper and impurities, and a vitreous enamel bonded to said cladding.

2. An enamelled clad product consisting of a core of an aluminum base alloy consisting essentially of aluminum, 0.3 to 5% magnesium, and at least one element of the group composed of 0.05 to 1% manganese, 0.05 to 0.35% chromium and 0.05 to 1% nickel, a cladding bonded to said core composed of aluminum, 0.2 to 0.75% copper and impurities, and a vitreous enamel bonded to said cladding.

3. An enamelled clad product consisting of a core of an aluminum base alloy consisting essentially of aluminum, 0.3 to 5% magnesium and 0.15 to 0.75% copper, a cladding bonded to said core composed of aluminum, 0.2 to 0.75% copper and impurities, and a vitreous enamel bonded to said cladding.

4. An enamelled clad product consisting of a core of an aluminum base alloy consisting essentially of aluminum, 0.3 to 5% magnesium and 0.2 to 3% silicon, said magnesium and silicon being present in sufficient amount to produce from about 0.5 to 7.9% of the intermetallic compound $Mg_2Si$, a cladding bonded to said core composed of aluminum, 0.2 to 0.75% copper and impurities, and a vitreous enamel bonded to said cladding.

5. An enamelled clad product according to claim 4 wherein the core alloy also contains at least one element of the group composed of 0.01 to 0.4% chromium, 0.1 to 0.5% manganese, 0.05 to 0.2% titanium and 0.1 to 0.5% nickel.

6. An enamelled product according to claim 4 wherein the core alloy also contains from 0.1 to 1% copper.

7. An enamelled product according to claim 4 wherein the core alloy also contains 0.1 to 1% copper and at least one element of the group composed of 0.01 to 0.4% chromium, 0.1 to 0.5% manganese, 0.05 to 0.2% titanium and 0.1 to 0.5% nickel.

8. A composite laminate for receiving a coating of a vitreous enamel comprising an aluminum base alloy core clad with an aluminum base alloy composed of aluminum, 0.2 to 0.75% copper and impurities, said core being composed of an aluminum base alloy consisting essentially of aluminum, 0.3 to 5% magnesium and 0.2 to 3% silicon, said magnesium and silicon being present in sufficient amount to produce from about 0.5 to 7.9% of the intermetallic compound $Mg_2Si$.

9. A composite laminate according to claim 8 wherein the aluminum base alloy core also contains at least one element of the group composed of 0.01 to 0.4% chromium, 0.1 to 0.5% manganese, 0.05 to 0.2% titanium and 0.1 to 0.5% nickel.

10. A composite laminate according to claim 8 wherein the aluminum base alloy core also contains from 0.1 to 1% copper.

11. A composite laminate according to claim 8 wherein the aluminum base alloy also contains from 0.1 to 1% copper and at least one element of the group composed of 0.01 to 0.4% chromium, 0.1 to 0.5 manganese, 0.05 to 0.2% titanium and 0.1 to 0.5% nickel.

12. An enamelled clad product consisting of a core of an aluminum base alloy consisting essentially of aluminum, 0.3 to 2.4% of magnesium and 0.2 to 2.6% of silicon, said magnesium and silicon being present in sufficient amount to produce from about 0.5 to 3% of $Mg_2Si$, a cladding bonded to said core composed of aluminum, 0.2 to 0.75% copper and impurities, and a vitreous enamel applied to said cladding.

References Cited

UNITED STATES PATENTS

| | | | |
|---|---|---|---|
| 2,084,327 | 6/1937 | Edwards | 29—195 |
| 3,235,961 | 2/1966 | Champion | 29—197.5 X |
| 1,662,383 | 3/1928 | Grimditch | 75—139 X |
| 2,821,014 | 1/1958 | Miller | 29—197.5 |
| 2,932,584 | 4/1960 | Hubbell | 117—53 |
| 3,133,796 | 5/1964 | Craig | 29—197.5 |

HYLAND BIZOT, *Primary Examiner.*